Aug. 20, 1935.  A. G. LEIGH  2,011,902
AIRPLANE
Filed Jan. 18, 1933  2 Sheets-Sheet 1
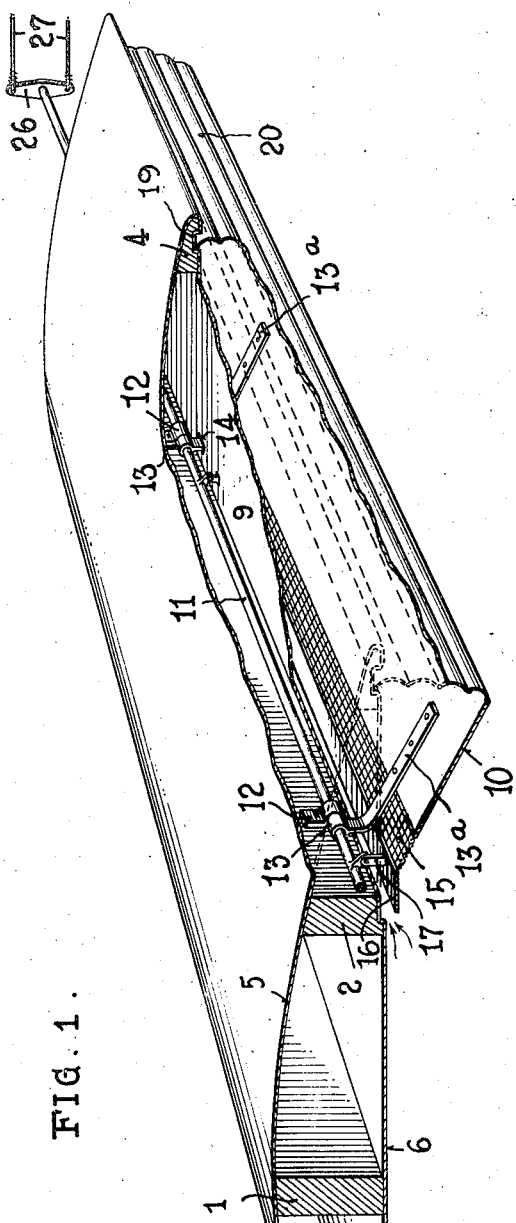
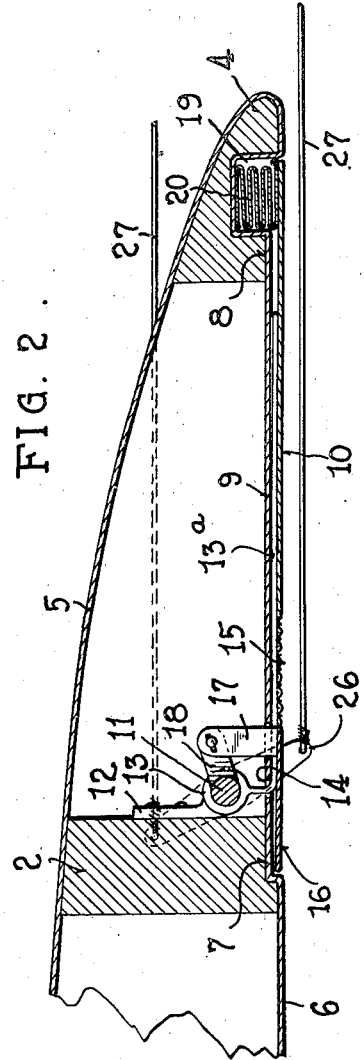
INVENTOR
ALFREDO GUILLERMO LEIGH,
BY
Stone, Boyden + Mack. ATTORNEYS Aug. 20, 1935.  A. G. LEIGH  2,011,902
AIRPLANE
Filed Jan. 18, 1933   2 Sheets-Sheet 2

INVENTOR
ALFREDO GUILLERMO LEIGH
BY
Stone, Boyden + Mack  ATTORNEYS

Patented Aug. 20, 1935

2,011,902

UNITED STATES PATENT OFFICE 2,011,902

AIRPLANE

Alfredo Guillermo Leigh, New York, N. Y., assignor to L. P. R. Company, Dover, Del., a corporation of Delaware Application January 18, 1933, Serial No. 652,247

13 Claims. (Cl. 244—29)

This invention relates to airplane brakes. More particularly it relates to that general class of airplane brakes which serve to decrease the landing speed of the planes.

As is well known in the art there is a definite positive correlation between the efficient cruising speed of an airplane and the landing speed. As a result of this it has in the past been necessary in the case of airplanes having high speeds to land at relatively higher speeds than is necessary with slower planes. This is principally due to the curvature of the wing surfaces and to the resistance to the air of the plane as a whole.

Many devices have been proposed which are designed to decrease the landing speed of a plane by either changing the camber of the wings in order to increase their lift or by providing means for increasing the air resistance of the plane just prior to landing. The chief difficulty with the majority of the devices disclosed by the prior art is that the construction of the devices is such that they in some degree increase the air resistance of the plane even when in the inoperative position and reduce the flying speed of the plane.

Another major defect universally prevalent in the constructions of the prior art is that due to the tremendous pressure of the air through which the airplane is passing upon the exposed surfaces of the plane great forces are required to operate devices for changing the curvature of the wings or for increasing the air resistance at the will of the pilot. As a result of the great amount of power required to operate these devices many problems have arisen which have made them commercially impractical and generally unsatisfactory.

An object of this invention is to provide a brake which may be attached to the wing surface of an airplane which will serve to increase materially the air resistance of the plane when the device is opened to operative position and which at the same time will alter the camber of the wing surface to make it more effective at slower speeds.

Another object of the invention is to provide an airplane brake which may be mounted upon any exposed surface of the airplane which when in the closed or inoperative position will offer a minimum of air resistance, and whose structure is such that the surface of the plane to which it is applied will not be materially weakened.

A still further object of the invention is to provide an airplane brake which is simple and cheap in construction and exceedingly effective in operation.

Yet another object of the invention consists in the provision of operating means for brakes of this general type in which the force of the air through which the plane is passing provides the force for actuating the brake.

Another object of the invention consists in the provision of operating means for the brake actuated by the force of the air through which the airplane is passing, and control means by which the pilot may control the application of this force.

Another object of the invention is to provide a brake for airplanes actuated by the air through which the airplane is passing in which the force of the air is not only used to move the brake to open or operative position but is also used to move the device to closed or inoperative position.

Still another object of the invention consists in providing means for controlling the functioning of the operating mechanism which is simple and effective in operation and which requires a minimum of force to operate.

Another object of the invention is to provide a brake which is actuated by the force of the air through which the airplane is passing which may be adjusted through a plurality of positions.

Many other and further objects of the invention will become apparent from the following specification when considered in connection with the drawings.

In the drawings:

Fig. 1 is a perspective view in section of an airplane wing showing the improved brake mounted on the lower surface thereof adjacent the trailing edge, parts being broken away to show the operating mechanism;

Fig. 2 is an enlarged sectional view of the trailing edge of the wing shown in Fig. 1, the brake being in a closed or non-braking position;

Figure 3:
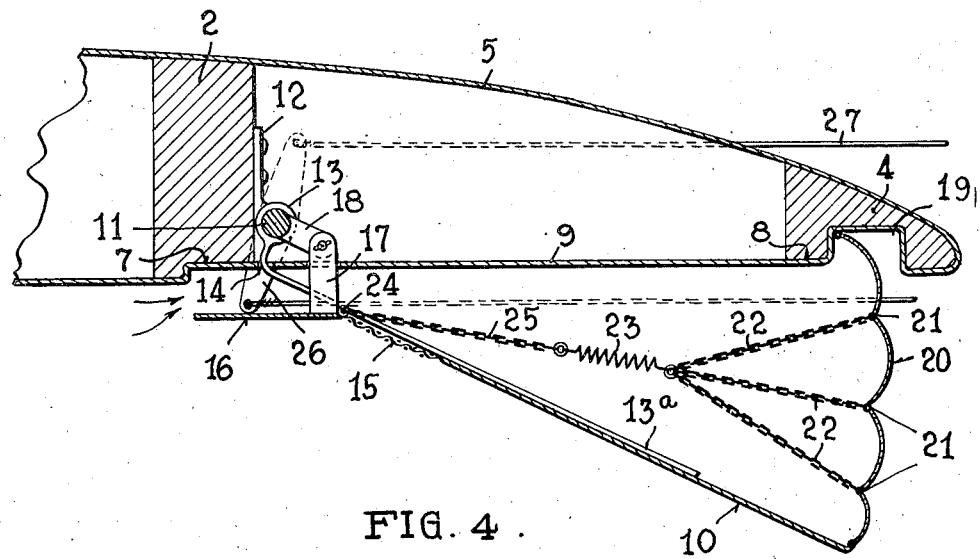
Fig 3 is a sectional view similar to Fig. 2 showing the brake in extended or braking position.

With more particular reference to the drawings, one embodiment of the invention is illustrated in Figs. 1, 2 and 3. In this form, the flap constituting the brake member is mounted on the lower wing surface adjacent the trailing edge, and for example, between the fuselage and the inner end of the aileron. As shown, the wing is, for the most part, of conventional construction comprising front and rear spars 1 and 2, respectively, a leading edge spar 3 and a trailing edge spar 4.

The upper surface 5 of the wing in entirety and the lower wing surface 6 from the rear spar forward as shown are of conventional construction. However, for the present invention, the rear spar 2 and the trailing edge spar 4 are rabbetted on their under sides to form stepped portions 7 and 8, respectively, between which extends the permanent lower wing surface 9. It will be seen that due to the stepped portions 7 and 8, the surface 9 is slightly offset from the plane of the lower wing surface 6 into the wing.

The braking member which is applied to the wing in this offset portion 9 of the lower surface comprises a main portion or flap 10 made of a sheet of metal or suitable frame and fabric construction in order to form a relatively stiff sheet. The flap 10 is hinged to an operating rod 11 which is journalled in suitable bearings 12 to the rear side of the spar 2 by means of hinge members 13 journalled on the rod 11 and secured to the surface of the flap 10.

The hinge members 13 are provided with a relatively long shank portion 13ª adapted to lie along the surface of the flap 10 and project beyond the edge thereof to position beneath the operating rod 11 and are then bent at right angles upwardly and journalled on the rod. These hinge members pass through suitable apertures 14 in the lower wing surface 9 and it will be seen that their shape and construction is such that the flap 10 may be swung through a considerable angle about the rod 11 as a pivot, without requiring a large aperture through which the hinges 13 pass.

The forward edge of the flap 10 is connected by means of a flexible fabric hinge portion 15 to a rigid strip 16 forming the forward edge of a brake member. The hinge portion 15 permits the strip 16 to be maintained in a substantially horizontal position while the flap 10 moves through considerable angular distance.

The strip 16 is provided adjacent the rear edge thereof with a plurality of upstanding lugs 17, which have their upper ends pivotally secured to cranks 18 which may be formed integrally with the operating rod 11. It will therefore be seen that rotation of the operating rod 11 throughout a portion of a revolution will serve to raise the strip 16 closely against the lower wing surface 9. At the same time, the forward edge of the strip 16 moves into the rabbetted portion of the spar 7 which is sufficiently deep so that the outer surface of the strip 16 will lie substantially flush with the remainder of the lower surface 6 of the wing. It will be seen, however, that movement of the strip 16 up and down will not necessarily have any effect upon the movement of the flap portion 10 of the brake, because of the flexible hinge 15 and because of the fact that the hinges 13 are journalled on the rod 11 and rotation of the rod 11 therefore will not necessarily cause movement of the hinges. The rear edge of the flap portion 10 is connected to the trailing edge spar of the wing by means of a flexible collapsible bellows 20. This bellows 20 connects the rear side and ends of the flap 10 with the lower surface of the wing and is adapted when collapsed to fold into a channel 19 cut in the stepped portion of the trailing edge spar. Each fold of the bellows 20 is provided with a stiffening rod 21, running throughout the entire length of the fold. As is seen in Figure 3, each of these stiffening rods is connected by means of a non-stretching connection, illustrated as a small chain 22, to one end of a tension coil spring 23, the forward end of the spring 23 being connected to a suitable ring 24 secured on the rear edge of the strip 16 by means of a chain or cable 25. These chains 22 and 25 or equivalent cables together with the spring 23 serve to insure the proper folding of the bellows when the flap portion 10 is moved up against the lower wing surface 9.

The stepped portion 8 and the channel 19 in the trailing edge spar are sufficiently deep so that when the bellows 20 is collapsed and folded into the channel 19, the flap 10 will lie closely adjacent the lower wing surface 9 and together with the hinge portion 15 and strip 16 will form an uninterrupted continuation of the lower wing surface 6 from the rear spar to the trailing edge of the wing.

The inner end of the operating rod 11 may be provided within the fuselage with any convenient means such as the lever 26 and operating wires 27, for causing rotation of the rod.

It will be apparent from the foregoing description that while the plane is in flight with the strip 16 lying against the stepped portion 7 of the rear spar, the pressure exerted on the lower wing surface of the plane by the air through which the wing is passing will force the flap 10 into substantially the position shown in Figure 2, that is closely against the lower wing surface 9. Due to the fact that the strip 16, the hinge 15 and the flap 10 form substantially a continuation of the lower wing surface 6, the brake member, when in this position, will offer little or no resistance to the air.

When it is desired to increase the resistance of the wing to the air in order to slow down the speed of the plane, the pilot will through control wires 27 cause the operating rod 11 to be rotated slightly so that the cranks 18 acting upon the lugs 17 of the strip 16 will move the strip downward to create an aperture between the strip 16 and the spar 2. It will be seen that the air through which the airplane is passing will immediately rush into this aperture forcing the flap 10 away from the lower wing surface 9 and extending the bellows 20 to substantially the position shown in Figure 3. It is obvious that with the flap 10 in the position shown in Figure 3, the air resistance of the plane is greatly increased.

It is also apparent that the camber of the wing section as a whole is materially altered and it has been found that when the improved brake is applied to a wing surface in the manner shown in Figs. 1, 2 and 3, the change of camber of the wing resulting from the movement of the flap 10 serves materially to increase the lifting effect of the wing section at slow speeds. It is clear from the foregoing that only a very small amount of mechanical force is required to rotate the operating rod 11 and that the actual force for actuating the brake mechanism is supplied by the air through which the airplane is passing. It will be seen that when the strip 16 is again moved to a position shown in Fig. 2, by rotating the operating rod 11, the force of air on the lower surface of the flap 10 will again return the flap to the position shown in Fig. 2.

Figure 4:
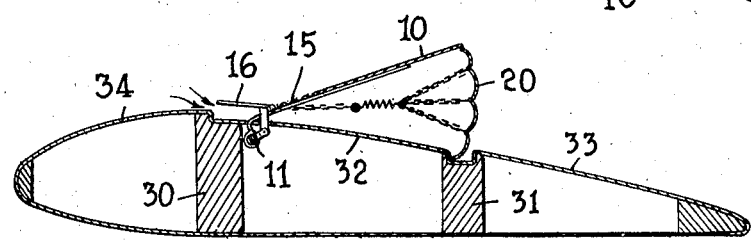
Fig. 4 is a sectional view of an airplane wing showing the improved brake applied to the upper surface thereof.

Brakes of this general type for increasing the air resistance of an airplane while in flight may obviously be applied to any of the substantially flat exposed surfaces of an airplane. They may as well be applied to the upper wing surfaces as illustrated in Fig. 4 which shows a wing of conventional form having front and rear spars 30 and 31. The upper surface 32 of the wing is set slightly downward into the wing to permit the installation of the brake. The operating rod 11 in this embodiment of the invention may be mounted on the rear side of the forward spar and may serve as a pivot for the hinges 13 as well as operating means for the strip 16. The portion of the upper surface of the wing 33 extending from the rear spar to the trailing edge of the plane is, as is seen, slightly above the level of the surface 32. Likewise the surface 34 from the forward spar to the leading edge is also slightly above the surface 32. Thus when the flap 10 in this modification is in the completely closed position, a strip 16, hinge 15, and flap 10, together with the surfaces 33 and 34 will together serve to form a continuous and uninterrupted upper wing surface of conventional curvature offering little or no more resistance to the air than a conventional airplane wing.

Figure 5:
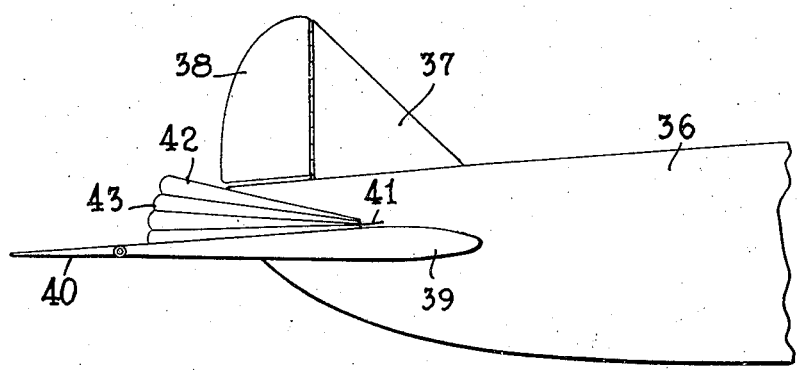
Fig. 5 is a side elevation of the tail of an airplane showing the improved brake mounted on the upper surface of one of the lateral fins.

In Figure 5 is shown a view illustrating how the improved brake may be applied to one of the stationary lateral fins of an airplane tail. As is conventional, the fuselage 36 is provided with a stationary vertical fin 37 and a movable vertical fin 38 on either side of which extend laterally stationary lateral fins 39 which have hinged at their rear edges rudders 40. As illustrated, the improved brake may be set into the upper surface of the lateral fin. The brake illustrated here is substantially the same in construction and operation as that illustrated in connection with the preceding figures comprising a movable strip 41, hinged flap 42, and bellows 43 provided with substantially similar operating means, the brake as shown in Fig. 5 is illustrated in the open position and it is obvious from the description of the brakes described in connection with the preceding figures that the brake 42, when moved to the closed position, will lie substantially in the upper surface of the lateral fin 39 offering little or no more resistance to the air than the conventional fin.

It is obvious that many and other further modifications of the invention will become apparent.

I claim:

1. An airplane brake comprising a flap having a body portion hinged to a portion of said airplane and adapted normally to lie closely adjacent an exposed surface thereof, a bellows connecting the body portion of said flap and the adjacent exposed surface of said airplane, a vent strip hinged to the body portion of said flap throughout the forward edge thereof and means for moving said vent strip to and from the adjacent exposed surface of said airplane to control the admission of the air through which the airplane is flying to the space defined by said surface, bellows and flap whereby the movement of said flap may be controlled.

2. An airplane brake comprising a flap pivoted adjacent its forward edge and adapted to lie normally closely adjacent the exposed surface of an airplane, said flap comprising a body portion and a vent strip hinged thereto, an expansible bellows connecting the body portion of said flap and the adjacent exposed surface of said airplane, said vent strip movable independently of the body portion of said flap and serving to control the admission of the air through which said airplane passes to the space defined by said flap, bellows and the surface of said airplane.

3. An airplane brake comprising a flap adapted to lie normally closely adjacent an exposed surface of said airplane, said flap pivoted adjacent its forward edge whereby it may be swung to a position oblique to the surface in which it normally lies, said flap comprising a body portion and a vent strip hinged to the forward edge of said body portion, said hinge allowing a limited movement of said vent strip independent of the body portion of said flap, an expansible bellows connecting the body portion of said flap and the adjacent exposed surface of said airplane, and means for moving said vent strip to and from the surface of said airplane whereby the admission of air to the space defined by said surface, bellows and flap may control the position of said flap.

4. In an airplane brake comprising a flap having a body portion and a vent strip hinged thereto, means for moving said vent strip to and from the adjacent surface of said airplane comprising an operating rod, cranks rigidly secured to said rod and links connecting said cranks and vent strip whereby rotation of said rod causes movement of said vent strip to or from the adjacent surface of said airplane.

5. In an airplane, means for changing the camber of the wing comprising a flap pivoted adjacent its forward edge and adapted to lie closely adjacent the surface of said wing, said flap comprising a body portion and a vent strip hinged thereto throughout the forward edge thereof, a bellows connecting the body portion of said flap and the adjacent surface of said wing, means for moving said vent strip to and from said wing independent of the body portion of said flap whereby the air through which the airplane passes may be admitted to the space defined by the wing surface bellows and flap to cause movement thereof.

6. In an airplane brake having a flap comprising a body portion and a vent strip hinged to the forward edge thereof, an operating rod for causing movement of said vent strip to and from said airplane and members secured to the body portion of said flap and pivoted to said operating rod whereby said flap may swing about said rod as a pivot independent of rotation thereof and independent of the movement of said vent strip.

7. The combination of an airplane and brake therefor comprising a flap adapted to lie normally parallel to an exposed surface of said airplane and be adjustable with respect to such surface, said flap comprising a body portion characterized by being substantially stiff and extending as a substantially plane surface, and a vent strip hinged to said body portion, said vent strip being adjustable with respect to and cooperating with the surface of said airplane to control the admission of air between said vent strip and said airplane surface to the space between said flap and said surface.

8. The combination with an airplane and brake therefor comprising a flap normally parallel to an exposed surface of said airplane and adjustable with respect to such surface, said flap comprising a main body portion characterized by being substantially stiff and extending as a substantially plane surface, a vent strip hinged to said body portion, said vent strip and said airplane surface together constituting a vent for the admission of air between said airplane surface and said vent to the space between said flap and said airplane surface, and means for controlling the size of said vent.

9. In an airplane, means for changing the camber of the wing comprising a flap pivoted adjacent its forward edge and adapted to lie closely adjacent the surface of said wing, said flap comprising a body portion and a vent strip hinged thereto throughout the forward edge thereof, an air compressible means connecting the body portion of said flap and the adjacent surface of said wing, means for moving said vent strip to and from said wing independent of the body portion of said flap whereby the air through which the airplane passes may be admitted to the space defined by the wing surface air compressible means and flap to cause movement thereof with respect to the main portion of the wing.

10. In an airplane, means for changing the camber of the wing comprising a flap pivoted adjacent its forward edge and adapted to lie closely adjacent the surface of said wing, a vent means connected at the forward edge of said flap, a bellows connecting said flap and the adjacent surface of said wing, means for moving said vent means to and from said wing independent of said flap whereby the air through which the airplane passes may be admitted to the space defined by the wing surface bellows and flap to cause movement thereof.

11. In an airplane, means for changing the camber of the wing comprising a flap pivoted adjacent its forward edge and adapted to lie closely adjacent the surface of said wing, a vent means connected at the forward edge of said flap, an air compressible means connecting said flap and the adjacent surface of said wing, means for moving said vent means to and from said wing independent of said flap whereby the air through which the airplane passes may be admitted to the space defined by the wing surface air compressible means and flap to cause movement thereof with respect to the main portion of the wing.

12. In an airplane, means for changing the camber of the wing comprising a flap pivoted adjacent its forward edge and adapted to lie closely adjacent the surface of said wing, said flap comprising a body portion and a vent means connected at the forward edge thereof, means for moving said vent means to and from the adjacent surface of the airplane for closing and opening said vent means to the passage of air therethrough, and a bellows connecting the body portion of said flap and the adjacent surface of said wing.

13. In an airplane, means for changing the camber of the wing comprising a flap pivoted adjacent its forward edge and adapted to lie closely adjacent the surface of said wing, said flap comprising a body portion and a vent means connected at the forward edge thereof, means for moving said vent means to and from the adjacent surface of the airplane for closing and opening said vent means to the passage of air therethrough, and an air compressible means connecting the body portion of said flap and the adjacent surface of said wing.

ALFREDO GUILLERMO LEIGH.